(12) United States Patent
Baum

(10) Patent No.: US 7,967,323 B2
(45) Date of Patent: Jun. 28, 2011

(54) DRAWBAR PROTECTOR

(76) Inventor: James T. Baum, Elgin, NE (US)

( * ) Notice: Subject to any disclaimer, the term of this patent is extended or adjusted under 35 U.S.C. 154(b) by 199 days.

(21) Appl. No.: 12/288,204

(22) Filed: Oct. 17, 2008

(65) Prior Publication Data

US 2010/0096835 A1 Apr. 22, 2010

(51) Int. Cl.
*B60D 1/60* (2006.01)
(52) U.S. Cl. .................................... 280/507; 280/515
(58) Field of Classification Search .................. 280/515, 280/507, 506, 493; 296/204, 30, 203.04, 296/183.1
See application file for complete search history.

(56) References Cited

U.S. PATENT DOCUMENTS

| | | | | |
|---|---|---|---|---|
| 2,970,852 A * | 2/1961 | Doll | ............................... | 280/515 |
| 3,876,242 A * | 4/1975 | Eaton | ............................ | 280/511 |
| 4,298,212 A * | 11/1981 | Jamison | ........................ | 280/515 |
| 4,899,843 A * | 2/1990 | Takano et al. | ................. | 180/312 |
| 4,929,018 A * | 5/1990 | Carty | ............................. | 296/204 |
| 5,394,948 A * | 3/1995 | Bunnell | ......................... | 172/677 |
| 6,024,039 A * | 2/2000 | Mack et al. | ................... | 114/218 |
| 6,854,793 B2 * | 2/2005 | Few | ................................. | 296/204 |
| 6,908,098 B2 * | 6/2005 | Milazzo | ......................... | 280/511 |
| 7,105,112 B2 * | 9/2006 | Czaplicki et al. | ............ | 264/46.5 |
| 7,131,849 B2 * | 11/2006 | Nishimura et al. | ............. | 439/67 |
| 2010/0096888 A1 * | 4/2010 | Cox | ................................ | 296/204 |

* cited by examiner

*Primary Examiner* — Tony H. Winner
(74) *Attorney, Agent, or Firm* — Dennis L. Thomte; Thomte Patent Law Offices, LLC

(57) ABSTRACT

A drawbar protector comprising a generally rectangular plate which is positioned on the upper rearward end of a tractor drawbar so that wear on the drawbar is prevented. If the protector plate becomes excessively worn, it is easily replaced.

3 Claims, 3 Drawing Sheets

DRAWBAR PROTECTOR

BACKGROUND OF THE INVENTION

1. Field of the Invention

This invention relates to a drawbar protector and more particularly to a protector which may be secured to and positioned on the upper surface of a tractor drawbar to prevent wearing of the drawbar.

2. Description of the Related Art

The upper surface of a tractor drawbar may become worn especially when the tractor is pulling an implement such as a grain cart or manure spreader which transfers a considerable amount of weight to the drawbar so that the tongue of the implement wears on the upper rearward surface of the drawbar. The worn appearance of a drawbar not only detracts from the aesthetic qualities of the tractor but also indicates that the tractor may have been operated much longer than the hour meter on the tractor indicates. The cost of replacing a worn drawbar is extremely expensive and is time consuming.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A tractor drawbar protector is described which is comprised of a generally rectangular metal plate having a forward end, a rearward end, an upper surface, a lower surface and opposite sides. The protector plate has a hitch pin opening formed therein forwardly of its rearward end which is designed to register with the hitch pin opening in the tractor drawbar. The protector plate has a pair of bolt openings formed therein forwardly of the hitch pin opening and are adapted to register with openings formed in the drawbar. Bolts are extended downwardly through the bolt openings in the protector plate and through the openings in the drawbar and are secured in place through the use of nuts. In use, wear is experienced on the protector plate rather than on the drawbar itself.

It is therefore a principal object of the invention to provide a drawbar protector for a tractor drawbar.

A further object of the invention is to provide a metal plate which may be secured to the upper surface of the rearward end of a tractor drawbar so that the plate will experience wear rather than the drawbar itself.

A further object of the invention is to provide a drawbar protector which may be easily fabricated to match the drawbar upon which it is to be attached.

A further object of the invention is to provide a drawbar protector which is easily and quickly secured to the upper rearward end of a tractor drawbar.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
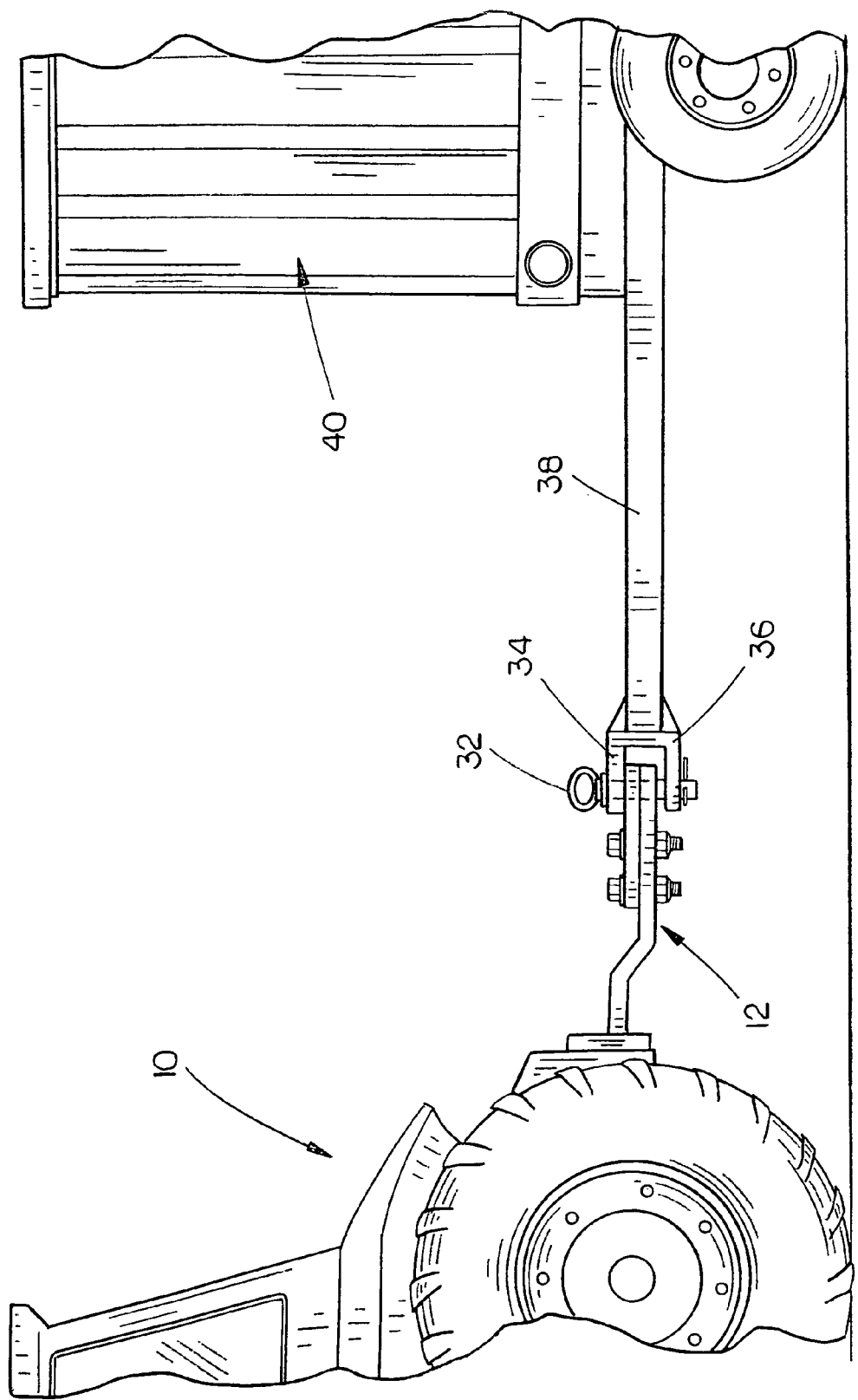
FIG. 1 is a partial side view illustrating the rearward end of a tractor having a rearwardly extending drawbar to which the drawbar protector of this invention is secured so that weight from the tongue of the trailing implement or trailer is imposed on the protector plate rather than the drawbar.
Figure 2:
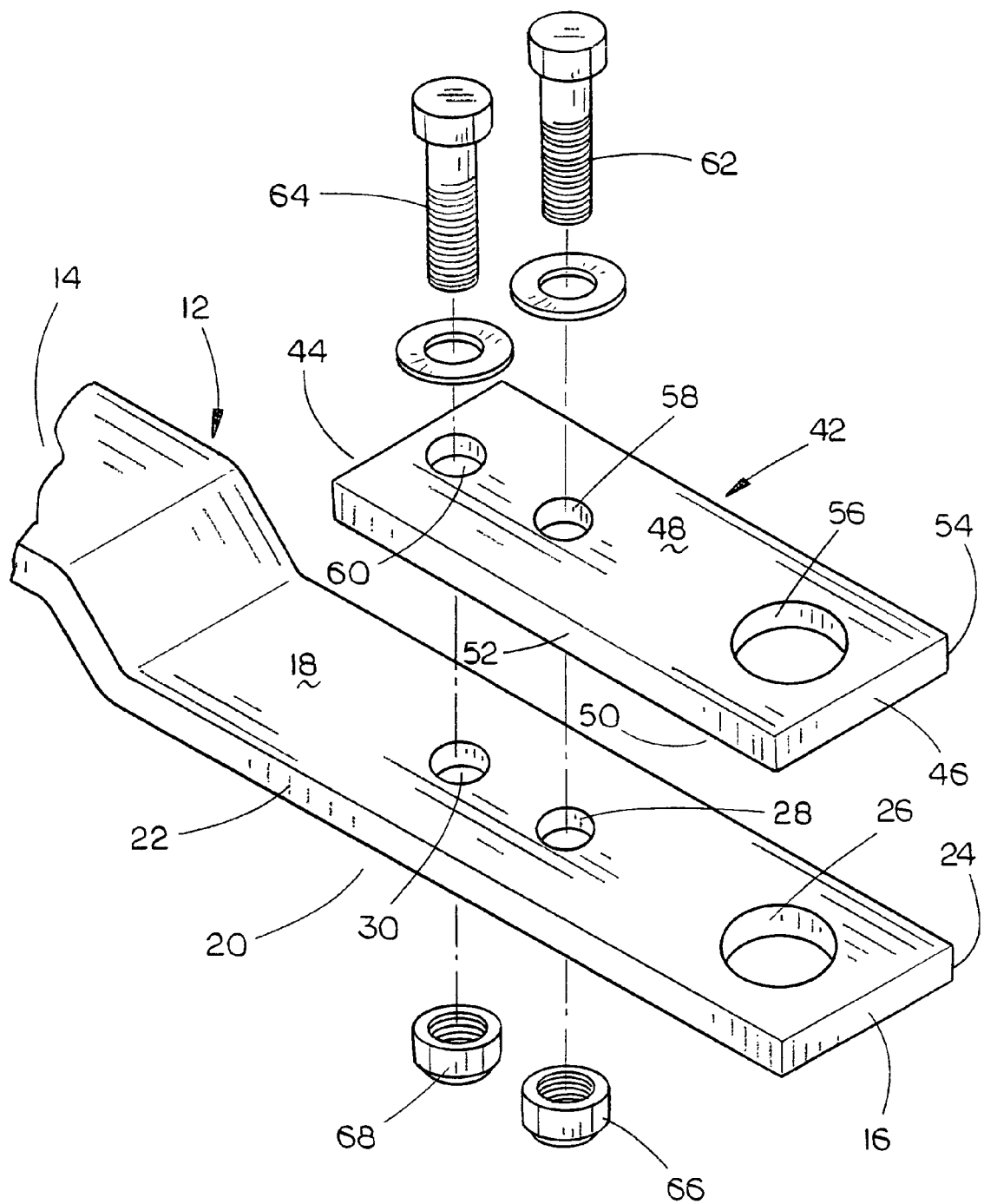
FIG. 2 is an exploded perspective view of the protector plate of this invention as well as the rearward portion of a tractor drawbar.
Figure 3:
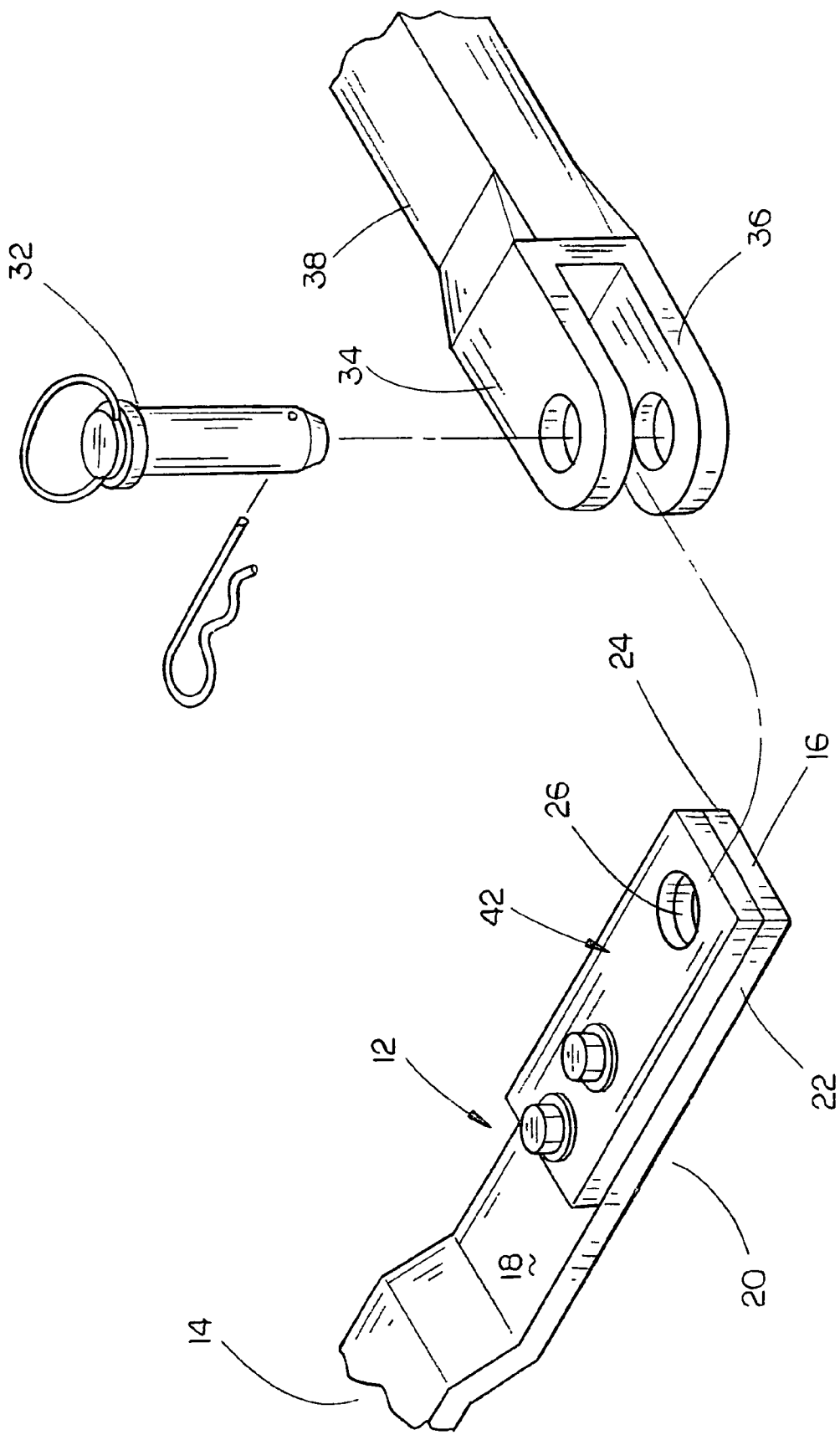
FIG. 3 is an exploded perspective view illustrating the manner in which the tongue of the trailing implement is secured to the assembly of the protector plate and drawbar.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In the drawings, the numeral 10 refers to a conventional tractor having a rearwardly extending drawbar 12 of conventional design. Drawbar 12 will be described as having a forward end 14, a rearward end 16, an upper surface 18, a lower surface 20 and opposite sides 22 and 24. Drawbar 12 includes a hitch pin opening 26 formed therein forwardly of its rearward end 16. Drawbar 12 usually has a pair of openings 28 and 30 formed therein forwardly of the hitch pin opening 26. If the openings 28 and 30 are not present in the drawbar 12, it will be necessary to drill the same in the drawbar.

In the drawings, it can be seen that a hitch pin 32 is utilized to secure the clevis elements 34 and 36 of tongue 38 which extends forwardly from an implement, trailer, manure spreader, etc. 40 to the drawbar 12. The drawbar protector plate of this invention is designated with the reference numeral 42 and will be described as having a forward end 44, a rearward end 46, an upper surface 48, a lower surface 50 and opposite sides 52 and 54. In the embodiment 1illustrated in the drawings, the plate 42 has a width of three inches, a length of nine and one-half inches and a thickness of one-half inch. Preferably, plate 42 is comprised of a steel material with the steel being heat-treated. The dimensions of the plate 42 will be dependent upon the particular drawbar to which it is attached.

Protector plate 42 has a hitch pin opening 56 formed therein which registers with hitch pin opening 26 in drawbar 12 and has bolt openings 58 and 60 formed therein which register with openings 28 and 30 of drawbar 12. Plate 12 is positioned on the upper surface 18 of drawbar 12 with the bolts 62 and 64 being extended through bolt openings 58 and 60 respectively and through openings 28 and 30 of drawbar 12 respectively. Nuts 66 and 68 are threaded onto bolts 62 and 64 respectively to secure the protector plate 42 to the drawbar 12.

In use, the upper clevis element 34 of the tongue 38 will rest upon the upper rearward surface of the protector plate 42 rather than the drawbar 12 so that the wear which would normally be experienced by the drawbar 12 is experienced by the protector plate 42. If the plate 42 becomes excessively worn, the plate is easily replaced with a new plate.

Thus it can be seen that a novel drawbar protector plate has been provided which prevents excessive wear on the drawbar 12 which would normally detract from the appearance of the tractor and would indicate that the tractor has perhaps more hours on it than the hour meter indicates.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination with a tractor drawbar having rearward and forward ends, an upper surface, a lower surface and opposite sides, with the drawbar having a hitch pin opening formed therein forwardly of its rearward end and a plurality of openings formed therein forwardly of the rearward end thereof, comprising:

a flat, generally rectangular metal drawbar protector plate having rearward and forward ends, an upper surface, a lower surface and opposite sides;

said protector plate having a hitch pin opening formed therein forwardly of its said rearward end and a plurality of bolt openings formed therein forwardly of its said rearward end;

said protector plate being positioned on the drawbar so that said lower surface of said protector plate is in direct contact with the upper surface of the drawbar with said openings in said protector plate registering with the openings in the drawbar; and bolts extending through the openings formed in the drawbar forwardly of the hitch pin opening therein and through the bolt openings formed in said protector plate to secure said protector plate to the drawbar.

2. The combination of claim 1 wherein said protector plate is comprised of a steel material.

3. The combination of claim 1 wherein said protector plate is comprised of a heat-treated steel.

* * * * *